United States Patent

Morris et al.

(10) Patent No.: US 10,122,551 B2
(45) Date of Patent: Nov. 6, 2018

(54) METHODS AND SYSTEMS FOR PROGRAMMABLE DIGITAL DOWN-CONVERSION

(71) Applicant: Telefonaktiebolaget LM Ericsson (publ), Stockholm (SE)

(72) Inventors: Bradley John Morris, Ottawa (CA); Lars Johan Thorebäck, Sundbyberg (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 15/156,770

(22) Filed: May 17, 2016

(65) Prior Publication Data

US 2016/0261432 A1    Sep. 8, 2016

Related U.S. Application Data

(63) Continuation of application No. 14/603,437, filed on Jan. 23, 2015, now Pat. No. 9,385,890, which is a continuation of application No. 13/130,211, filed as application No. PCT/IB2010/002927 on Nov. 18, 2010, now Pat. No. 8,948,291.

(51) Int. Cl.
H04L 27/06 (2006.01)
H04L 25/02 (2006.01)
H04L 27/38 (2006.01)

(52) U.S. Cl.
CPC ............ *H04L 25/02* (2013.01); *H04L 27/06* (2013.01); *H04L 27/38* (2013.01)

(58) Field of Classification Search
CPC .......... H04L 25/02; H04L 27/06; H04L 27/38
USPC ...................................................... 375/340
See application file for complete search history.

(56) References Cited

U.S. PATENT DOCUMENTS

| | | | |
|---|---|---|---|
| 6,611,570 B1 | 8/2003 | Subramanian | |
| 6,898,257 B2 | 5/2005 | Fischer et al. | |
| 2003/0165200 A1 | 9/2003 | Pugel | |
| 2003/0165220 A1* | 9/2003 | Goodman | H04H 20/81 379/93.01 |
| 2003/0179831 A1* | 9/2003 | Gupta | H03F 1/3247 375/296 |
| 2006/0078128 A1 | 4/2006 | Meeusen | |
| 2008/0049868 A1 | 2/2008 | Brobston | |
| 2008/0144539 A1 | 6/2008 | Sperlich et al. | |
| 2009/0316838 A1 | 12/2009 | Fuller et al. | |
| 2010/0098191 A1 | 4/2010 | Morris et al. | |

(Continued)

FOREIGN PATENT DOCUMENTS

| | | |
|---|---|---|
| JP | 2008-219560 A | 9/2008 |
| JP | 2009-95069 A | 4/2009 |
| KR | 10-2004-0070921 A | 8/2004 |

OTHER PUBLICATIONS

International Search Report for PCT/IB2010/002927 dated Sep. 7, 2011.
Written Opinion for PCT/IB2010/002927 dated Sep. 7, 2011.
International Preliminary Report on Patentability issued in corresponding International Application No. PCT/IB2010/002927, dated Jan. 31, 2013.

(Continued)

*Primary Examiner* — Tanmay Shah
(74) *Attorney, Agent, or Firm* — Patent Portfolio Builders PLLC

(57) ABSTRACT

A radio communication apparatus operable over a wide range of frequencies including a signal processing device is provided. The device performs an analog to digital conversion at a predetermined sample rate independent of a selected frequency band within the wide range of frequencies to generate a digital signal, and digitally processes the digital signal to output a data signal at baseband associated with the selected frequency band.

17 Claims, 8 Drawing Sheets

(56) References Cited

U.S. PATENT DOCUMENTS

2011/0181701 A1    7/2011  Varslot et al.
2011/0206163 A1*   8/2011  Lowdermilk .......... G01R 23/16
                                                      375/316

OTHER PUBLICATIONS

Japanese Office Action in corresponding Japanese Application No. 2013-539346 dated Jul. 22, 2014.
Japanese Office Action in related Japanese Application No. 2013-539346, dated Feb. 10, 2015 (with English translation of Summary of Reason for Refusal (final)).
Cheng, Kuang-Wei et al., "A Current Reuse Quadrature GPS Receiver in 0.13 mu CMOS," IEEE Journal of Solid-State Circuits, IEEE Service Center, Piscataway, NJ, USA, vol. 45, No. 3, Mar. 1, 2010, pp. 510-523, XP011303482, ISSN: 018-9200, DOI: 10.1109/JSSC.2009.2039272.
Guoying, Sun et al., "An Improved DRFM System Based on Digital Channelized Receiver," 2nd International Congress on Image and Signal Processing, 2009, CISP '09, IEEE, Piscataway, NJ, USA, Oct. 17, 2009, pp. 1-5, XP031557165, ISBN: 978-1-4244-4129-7.
Sommarek, J. et al., "A Digital Quadrature Modulator with On-Chip D/A Converter," Conference on European Solid-State Circuits, 2003, ESSCIRC '03, Piscataway, NJ, USA, IEEE, Sep. 16, 2003, pp. 85-88, XP032156336, DOI: 10.1109/ESSCIRC.2003.1257078, ISBN: 978-0-7803-7995-4.
Office Action in corresponding Korean Patent Application No. 2013-7012629 dated Oct. 5, 2016.
Office Action in European Application No. 10 798 181.3 dated Feb. 9, 2018.

* cited by examiner

FIG. 2A
FIG. 2B
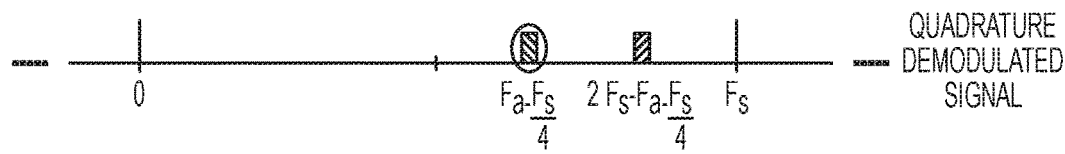
FIG. 2C
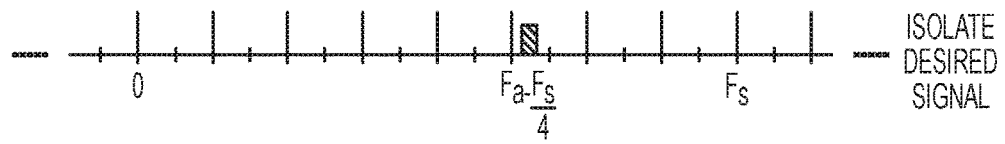
FIG. 2D
FIG. 2E
FIG. 2F

METHODS AND SYSTEMS FOR PROGRAMMABLE DIGITAL DOWN-CONVERSION

CROSS-REFERENCE TO RELATED APPLICATIONS

This application is a continuation of U.S. patent application Ser. No. 14/603,437, filed on Jan. 23, 2015, which is a continuation of U.S. patent application Ser. No. 13/130,211, filed on Sep. 9, 2011, issued as U.S. Pat. No. 8,948,291 on Feb. 3, 2015, entitled "Methods and Systems for Programmable Digital Down-Conversion", which is related to, and claims priority from, a 371 of International Application No. PCT/IB2010/002927, filed on Nov. 18, 2010, the disclosure of which is incorporated here by reference.

TECHNICAL FIELD

The present invention generally relates to methods and systems configured to extract a data signal from a received quadrature modulated analog signal, using digital down conversion which is programmable to accommodate a plurality of frequency bands.

BACKGROUND

Existing radio receivers use analog down-converters to convert a radio frequency (RF) signal to a signal with one or more lower intermediate frequencies (IF). The analog down-converters may have a heterodyne (one IF), super-heterodyne (multiple IFs), or zero IF architecture (the IF is actually 0 Hz). The analog down-converters suffer from analog impairments, such as analog variability, (e.g., component to component variability, temperature variability, voltage variability and variability due to aging) and inflexibility (i.e., an analog down-converter that is designed to operate efficiently for a specific frequency band, such as, 880-915 MHz, does not work well for other frequency bands, such as, 1920-1980 MHz).

Some of the analog down-converters are also affected by other problems (although not all architectures have all of the following listed problems): a variation over frequency (phase and amplitude), a quadrature imbalance (the inphase component leaking in to the quadrature component or vice versa), a gain imbalance, a DC offset, and a limited image rejection.

These impairments and problems currently make it difficult to design an analog down converter capable of processing radio frequency signals with frequencies spanning a wide frequency range (e.g., operating well both for the 880-915 MHz band and for 1920-1980 MHz band).

Commercially available digital down converters are not intended nor are capable of down converting a directly sampled radio frequency signal to baseband (0 Hz). It is generally assumed that the analog signals input to these digital down converters have already been brought to the intermediate frequency in a previous analog section of the signal processing chain.

Accordingly, it would be desirable to provide devices, systems and methods that avoid the afore-described problems and drawbacks.

SUMMARY

It is an object to overcome some of the deficiencies discussed in the previous section and to provide methods and devices capable to operate over a wide range of frequencies including a plurality of predetermined frequency bands. One or more of the independent claims advantageously provides a reduced cost and reliability in extracting a data signal from a received quadrature modulated analog signal.

According to one exemplary embodiment, a radio communication apparatus operable over a wide range of frequencies includes a signal processing device configured to receive an analog signal, to perform an analog to digital conversion at a predetermined sample rate independent on a selected frequency band within the wide range of frequencies, and to output a data signal at baseband, while focusing on the selected frequency band during digital signal processing.

According to another exemplary embodiment, a method of processing a quadrature modulated analog signal to output a digital data signal while focusing on any selected frequency band within a wide range of frequencies in a digital signal is provided. The method includes filtering a received analog signal to output a filtered analog signal including components having frequencies in a predetermined frequency range. The method further includes converting at a predetermined sample rate, the filtered analog signal into a digital signal, and demodulating the digital signal to output a complex digital signal. The method further includes filtering the complex digital signal to include a single image in a complex data signal. The method also includes down-sampling the filtered complex digital signal, to generate a down-sampled complex signal that includes one sample out of each group of N sequential samples in the filtered complex digital signal, where N is an integer number larger than or equal to two, and depends on the selected frequency band. The method further includes extracting a complex baseband data signal from the down-sampled complex signal.

According to another exemplary embodiment, a method of processing a modulated analog signal includes converting an analog signal into a digital signal at a sample rate independent of a targeted one of a plurality of predetermined frequency bands. The method further includes quadrature demodulating the digital signal to output a complex signal. The method also includes filtering, and down-sampling the filtered complex signal to output one sample out of each group of N sequential samples in an input digital signal, where N is an integer number larger than or equal to two and depends on the selected one of the predetermined frequency bands, the filtering and down-sampling being performed using a polyphase filter.

According to another exemplary embodiment, a method of manufacturing a radio communication system operable over a wide frequency range including a plurality of frequency bands includes mounting a quadrature demodulator, a complex channel filter and a down-sampler between an analog to digital converter and a baseband tuner, on a substrate. The method further includes mounting a frequency band selector configured to provide operating parameters related to a targeted band among the plurality of frequency bands, to the complex channel filter and to the down-sampler.

According to another exemplary embodiment, a method of manufacturing a radio communication system operable over a wide frequency range including a plurality of frequency bands includes mounting a quadrature demodulator and a polyphase filter between an analog to digital converter and a baseband tuner, on a substrate. The method further includes mounting a frequency band selector configured to provide operating parameters related to a targeted band among the plurality of frequency bands, to the polyphase filter.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 2A represents a frequency spectrum of a signal output by an analog filter of an apparatus according to an exemplary embodiment;

FIG. 2B represents a frequency spectrum of a signal output by an analog to digital converter of an apparatus according to an exemplary embodiment;

FIG. 2C represents a frequency spectrum of a complex signal output by a quadrature demodulator of an apparatus according to an exemplary embodiment;

FIG. 2D represents a frequency spectrum of a complex filtered signal output by a complex channel selection filter of an apparatus according to an exemplary embodiment;

FIG. 2E represents a frequency spectrum of a complex signal output by a digital down converter of an apparatus according to an exemplary embodiment;

FIG. 2F represents a frequency spectrum of a complex data signal at baseband output by a complex baseband tuner of an apparatus according to an exemplary embodiment;

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of radio frequency receivers. However, the embodiments to be discussed next are not limited to these systems but may be applied to other systems configured to process radio frequency signals.

Reference throughout the specification to "one embodiment" or "an embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

Methods and apparatuses described hereinafter achieve a flexible digital down-conversion of a radio signal sampled at a predetermined sample rate, over a wide range of frequencies, by, for example, combining digital quadrature demodulation, digital filtering, aliasing caused by decimating sampled signals, and digital complex tuning.

Figure 1:
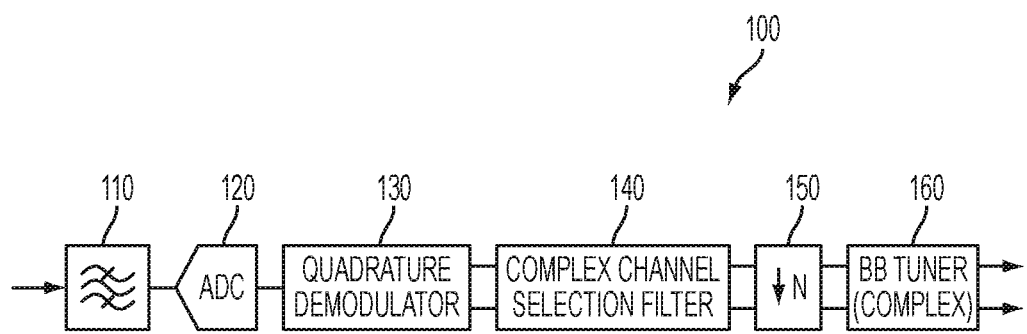
FIG. 1 is a schematic diagram of an apparatus configured to receive an analog signal, to down convert the sampled analog signal digitally, and to output a digital signal at baseband, according to an exemplary embodiment.

For purposes of illustration and not of limitation, according to an exemplary embodiment, an apparatus 100 illustrated in FIG. 1 is configured to receive a quadrature modulated analog radio signal, and to output a baseband data signal.

The apparatus 100 illustrated in FIG. 1 includes an analog filter 110, an analog to digital converter (ADC) 120, a quadrature demodulator 130, a complex channel selection filter 140, a digital down-sampler 150 and a baseband tuner 160.

The analog filter 110 is configured to receive the quadrature modulated analog radio signal and to filter the received analog signal to pass only components having frequencies in a part or all frequency range of a Nyquist zone in which the analog to digital converter (ADC) 120 provides enough performance. A Nyquist zone is defined as having a bandwidth equal to a half of a sampling frequency ($F_s$). The frequency domain includes an infinite number of such zones. For example, in the positive frequency domain, a first Nyquist zone is from "0" frequency (i.e., DC) to $F_s/2$, a second Nyquist zone is from $F_s/2$ to $F_s$, a third Nyquist zone is from $F_s$ to $3F_s/2$, etc. Under the assumption that an image of the targeted frequency band is around a frequency $F_a$, FIG. 2A represents a frequency spectrum of the filtered signal output by the analog filter 110.

The ADC 120 is configured to sample the analog filtered signal output by the analog filter 110, at the sampling frequency $F_s$. Recently, ADC devices having high sample rates and increased precision of the samples have become available. According to Nyquist's sampling theorem, if an analog signal is sampled at least twice as fast as its frequency, no information is lost when the signal is reconstructed. When the analog signal has a frequency above half of the sample frequency, the signal is sub-sampled and 'reflects' or 'folds' relative to $F_s/2$. Thus, for example, an ADC capable of a sampling speed of 2 GSps (Giga-samples-per-second) provides enough samples for both a frequency band around 900 MHz, and a frequency band around 1900 MHz provided the signal of interest is contained in one Nyquist zone. One may consider that the apparatuses and methods described hereinafter have a particular relevance for sampling rate larger than 1 GSps although they are not limited thereof.

FIG. 2B represents a frequency spectrum of the digital signal output by the ADC 120. The signal output by the ADC 120 is a real signal, and it is still a quadrature modulated signal. After the sampling, in the digital signal, the frequency spectrum of the analog signal around $F_a$ is reflected relative to $F_s/2$, and the frequency distribution with similar shape to the one in the 0 to $F_s$ interval is repeated in all other $(n-1,n)$ $F_s$ intervals (where n is any integer number).

Generally, the ADC 120 operates at a predetermined sample rate, but the sample rate does not have to be fixed. A clock signal (which can be generated by a local oscillator, not shown) is used to drive the ADC 120 to perform sampling at a predetermined sample rate. The frequency of the clock signal may be fixed or variable.

The quadrature demodulator 130 is configured to receive the sampled signal output by the ADC 120 and to transform the received digital signal into a complex signal having a frequency distribution shifted relative to the one in the digital signal. For example, the frequencies may be shifted with $F_s/4$, to be around $F_a-F_s/4$ and $2F_s-F_a-F_s/4$ (i.e., a high-side mixing and a low-side mixing). FIG. 2C represents a frequency spectrum of the complex signal output by the quadrature demodulator 130. The location of the quadrature demodulator 130 in the signal processing chain may be different from its location in the apparatus 100 as will be discussed in more detail below.

The complex channel selection filter 140 filters out a part of the complex signal having frequencies around $2F_s-F_a-F_s/4$, outputting the remaining signal having frequencies around $F_a-F_s/4$. FIG. 2D represents a frequency spectrum of the complex filtered signal output by the complex channel selection filter 140.

The digital down-sampler 150 decimates the complex signal received from the complex channel selection filter 140, by discarding N−1 out of N samples, to output a signal having new lower frequencies around $F_{aliased}=\mathrm{mod}(F_a-F_s/4, F_s/N)$. For example, if N=8, FIG. 2E represents a frequency spectrum of the new lower frequencies complex signal output by the digital down converter 150, having frequencies around $\mathrm{mod}(F_a-F_s/4, F_s/8)$. The presence of the digital down-sampler 150 reduces the number of samples and, consequently, the power consumption for the complex baseband tuner 160. The location of the digital down converter 150 in the signal processing chain may be different from its location in the apparatus 100.

The complex baseband tuner 160 then coverts the new lower frequency signal output by the complex channel selection filter 140 to baseband (i.e., centered at 0 Hz). FIG. 2F represents a frequency spectrum of the digital signal at baseband output by the complex baseband tuner 160. An example of a complex baseband tuner is described in U.S. Patent Application Publication 2009/0316838 which is incorporated herewith by reference in its entirety.

In view of the above description of the apparatus 100, a person of skill in the art, understands that the apparatus 100 operates with different parameters depending on the frequency band targeted. That is, the apparatus 100 is configured to be usable over a wide range of frequencies, but at a given time, it is tuned to target a predefined frequency band among the frequency bands covered by this wide range. Selecting a specific frequency band can physically consist of specifying a complex tuner frequency (which may be zero), N, and the filter coefficients.

The information about the selected band may be necessary, as an operating parameter, to select one of a plurality of available filters to be the analog filter 110. However, the ADC 120 can operate at the same sampling rate regardless of the targeted frequency band, (so it does not need to receive the information about the selected band). Similar to the ADC 120, the quadrature demodulator 130 does not need to receive information about the selected band, as an operating parameter.

The complex channel selection filter 140 is a digital filter running at a sample rate of $F_s$ and selecting frequencies between $0<=F_a<=F_s$. However, the complex channel selection filter 140 can operate to filter out the part of the complex signal having frequencies around $2F_s-F_a-F_s/4$, and to output the part of the complex signal having frequencies around $F_a-F_s/4$. The complex channel selection filter 110 may include a plurality of filters corresponding to different targeted bands which are each inserted into (or removed from) the signal processing chain depending on the information about the targeted band to be processed.

The number N, which characterizes operation of the digital down-sampler 150, depends on the targeted frequency band. The fine tuning of the relationship between a final output sample rate and the ADC sample rate may be achieved by adding a rate change filter after the complex channel selection filter 140. Consider, for example, that the maximum possible ADC sample rate is 2.5 GSps and the final targeted sample rate is around 245.76 MSps (an exemplary rate related to the LTE sample rates). For implementation simplicity, an integer power of 2 decimation is required (in the example N=8). Without a rate change filter this would imply an ADC sample rate of 1966.08. By adding a 8/10 rate change filter the required ADC sample rate becomes 2.4576 GSps, which is much closer to the maximum possible rate. Having fine control of the final sample rate allows systems level optimizations. The rate change filter can, for example, be provided after the complex tuner.

In one embodiment, a user interface or controller allows a user of the apparatus 100 to select one of the frequency bands within the wide range of frequencies covered by the apparatus 100 and the user interface or controller can then provide the apparatus 100 with the operating parameters, such as, the complex tuner frequency (possibly zero), N, and filter coefficients, which configure the apparatus 100 to perform digital down conversion for a selected frequency band.

Figure 3:
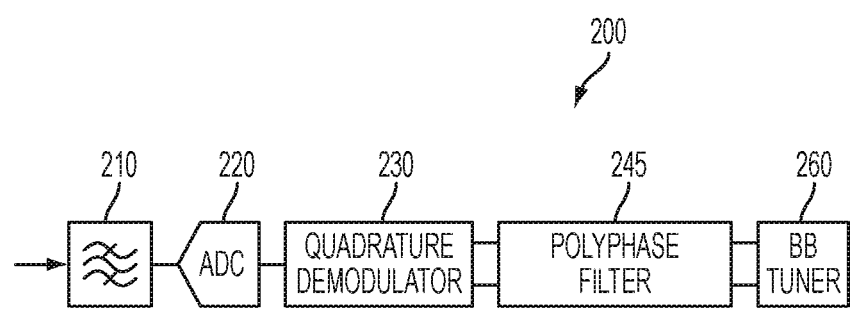
FIG. 3 is a schematic diagram of an apparatus, according to another exemplary embodiment.

In an alternative embodiment illustrated in FIG. 3, apparatus 200 includes an analog filter 210, an ADC 220, a quadrature demodulator 230 and a baseband complex tuner 260 similar to the analog filter 110, the ADC 120, the quadrature demodulator 130 and the baseband complex tuner 160. In the apparatus 200, the functionality of the complex channel filter and of the digital down sampler is achieved by using a polyphase filter 245.

In another alternative embodiment, further hardware optimization is achieved by combining the polyphase filter 245 with the quadrature demodulator 230, if N is an integer multiple of 4. In this case, the combined filter/quadrature demodulator complexity is reduced with no impact on the tuning flexibility.

Figure 4:
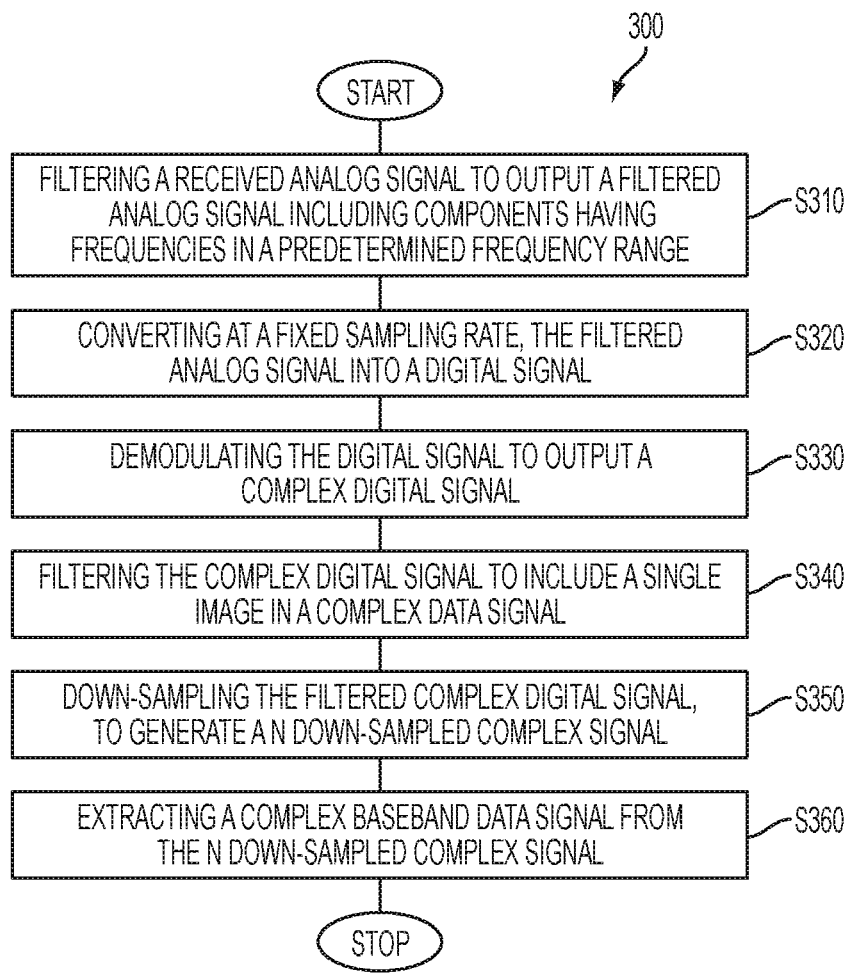
FIG. 4 is a flow chart illustrating steps performed in a method of processing a quadrature modulated analog signal to output a digital data signal, according to an exemplary embodiment.

FIG. 4 is a flow chart illustrating steps performed in a method 300 of processing a quadrature modulated analog signal to output a digital data signal. The method 300 may be performed by the apparatus 100.

At S310, the method 300 includes filtering a received quadrature modulated signal to select a part of the received analog signal including components having frequencies in a predetermined frequency range. Further, at S320, the method 300 includes converting at a predetermined sample rate, the part of the received analog signal into a digital signal.

At S330, the method 300 includes demodulating the digital signal to output a complex digital signal. Then, at S340, the method 300 includes filtering the complex digital signal to include a single image in a complex data signal. At S350 the method 300 includes down-sampling the filtered complex digital signal, to generate a down-sampled complex signal that includes one sample out of each group of N sequential samples in the filtered complex signal, where N is an integer number larger than or equal to two. Finally, at S360, the method 300 includes extracting a complex baseband data signal from the down-sampled complex signal.

The method 300 may also include selecting one of a plurality of predetermined frequency bands within an operable frequency range. One or more of the filtering (S310) of the received quadrature modulated signal, the filtering (S340) of the complex digital signal, and the down-sampling (S350) of the filtered complex digital signal are performed with operating parameters depending on the selected one of the plurality of predetermined frequency bands. Thus, the predetermined frequency range may depend on the selected one of the plurality of predetermined frequency bands. The down-sampling may be performed for a value of N depending on the selected one of the plurality of predetermined frequency bands. The down-sampling may also be performed for values of N that are powers of 2.

Figure 5:
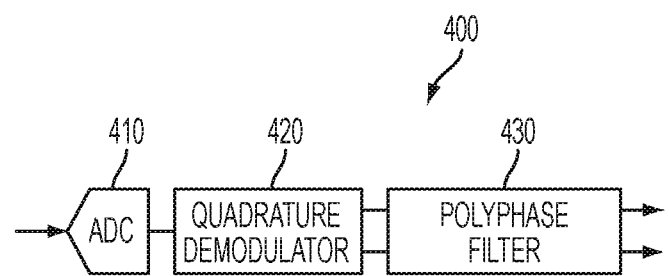
FIG. 5 is a schematic diagram of a device in a radio communication system, according to an exemplary embodiment.

FIG. 5 illustrates a device 400 usable in a radio communication system together with other (not shown) conventional components. Presence of a device such as 400 renders the radio communication system operable over a wide range of frequencies including a plurality of predetermined frequency bands.

The device 400 in FIG. 5 includes an analog to digital converter 410 configured to covert an analog signal into a digital signal at a sample rate independent of a targeted one of the predetermined frequency bands. Further, the device 400 includes a quadrature demodulator 420 configured to convert the digital signal received from the analog to digital converter 410, into a complex signal.

The apparatus 400 further includes a polyphase filter 430 configured to filter the complex signal to include a single image of the targeted one of the predetermined frequency bands and to down-sample the filtered complex signal to output one sample out of each group of N sequential samples. Here N is an integer number larger than or equal to 2 and depends on the selected one of the predetermined frequency bands.

Figure 6:
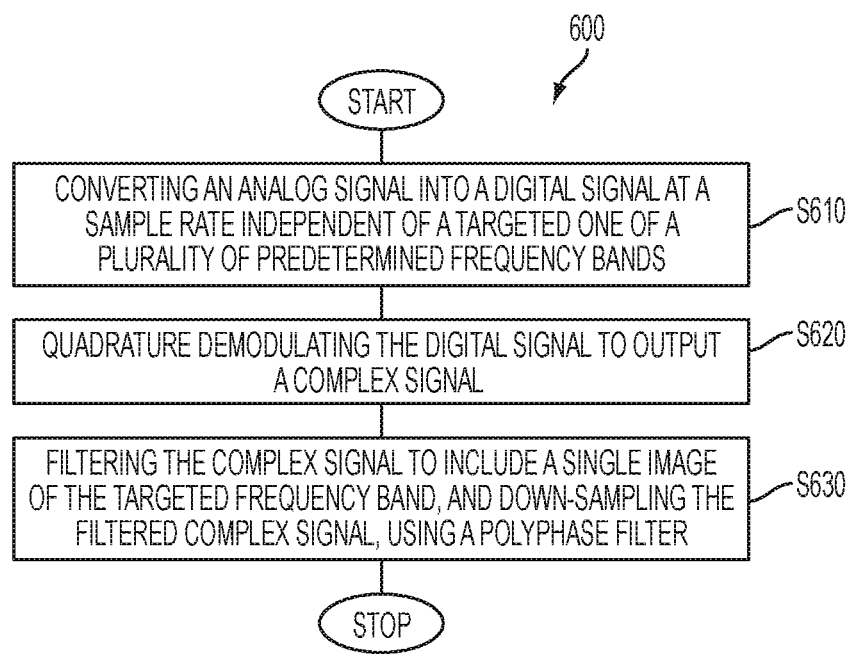
FIG. 6 is flow chart illustrating steps performed in a method of processing a modulated analog signal, according to an exemplary embodiment.

FIG. 6 includes a flow chart illustrating steps performed in a method 600 of processing a modulated analog signal. At S610, the method 600 includes converting an analog signal into a digital signal at a sample rate independent of a targeted one of the predetermined frequency bands. At S620, the method 600 includes quadrature demodulating the digital signal to output a complex signal. Method 600, further includes, at S630, filtering the complex signal to include a single image of the targeted one of the predetermined frequency bands, and down-sampling the filtered complex signal to output one sample out of each group of N sequential samples, the filtering and down-sampling being performed using a polyphase filter. Here, N is an integer number larger than or equal to two and depends on the selected one of the predetermined frequency bands.

Figure 7:
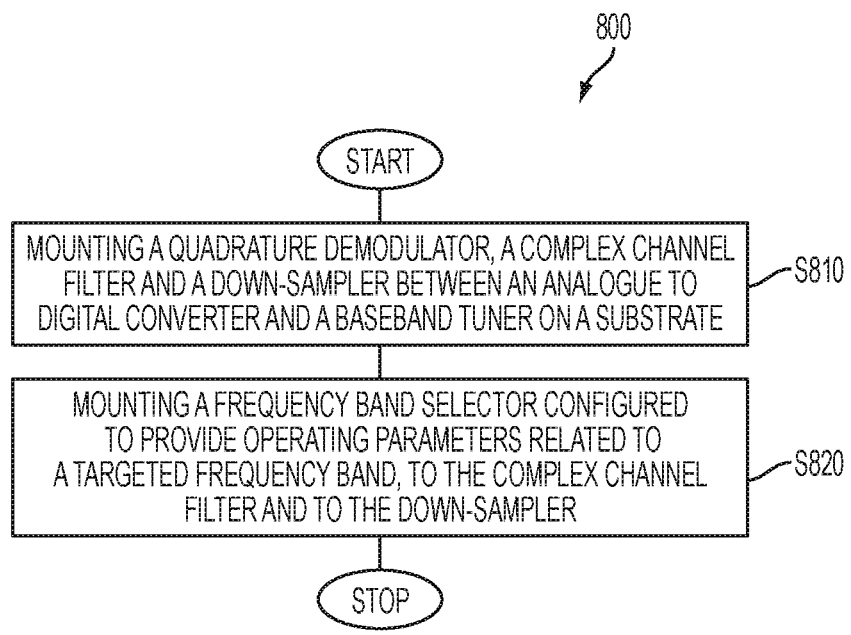
FIG. 7 is a flow chart illustrating steps performed in a method of manufacturing a radio communication system operable over a wide frequency range including a plurality of frequency bands, according to an exemplary embodiment.
Figure 8:
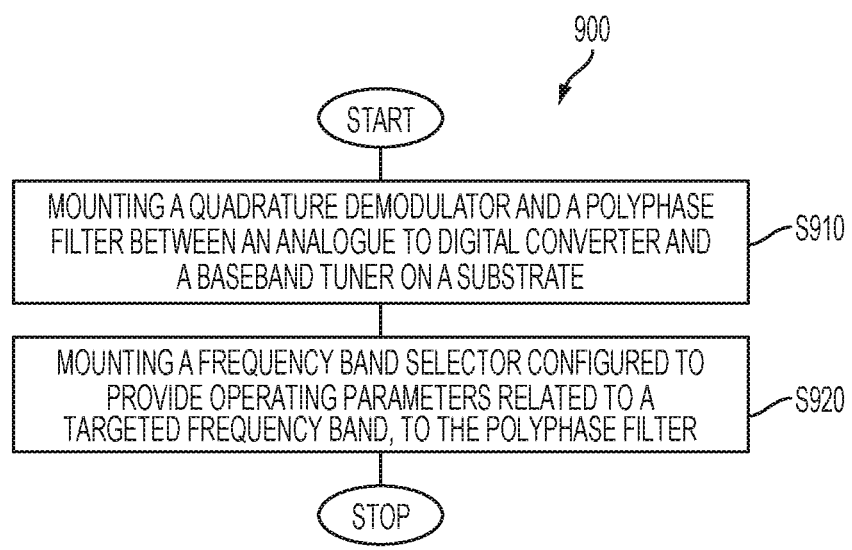
FIG. 8 is a flow chart illustrating steps performed in a method of manufacturing a radio communication system operable over a wide frequency range including a plurality of frequency bands, according to another exemplary embodiment.

FIGS. 7 and 8 are flow charts illustrating steps performed in methods 800 and 900 of manufacturing a radio communication system operable over a wide frequency range including a plurality of frequency bands. At step S810, method 800 includes mounting a quadrature demodulator, a complex channel filter and a down-sampler between an analog to digital converter and a baseband tuner. Further, at S820, method 800 includes mounting a frequency band selector configured to provide operating parameters related to a targeted frequency band among the plurality of frequency bands, to the complex channel filter and to the down-sampler.

Method 900 includes mounting a quadrature demodulator and a polyphase filter between an analog to digital converter and a baseband tuner, at S910. Method 900 further includes mounting a frequency band selector configured to provide operating parameters related to a targeted band among the plurality of frequency bands, to the polyphase filter, at S920.

The disclosed exemplary embodiments provide methods and devices usable in radio communication system and for manufacturing thereof. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a radio communication device. Accordingly, the exemplary embodiments may take the form of an entirely hardware embodiment or an embodiment combining hardware and software aspects.

Although the features and elements of the present exemplary embodiments are described in the embodiments in particular combinations, each feature or element can be used alone without the other features and elements of the embodiments or in various combinations with or without other features and elements disclosed herein.

What is claimed is:

1. A radio communication apparatus operable over a wide range of frequencies, comprising:
   a signal processing device configured to receive an analog signal, to perform an analog to digital conversion at a predetermined sample rate independent of a selected frequency band within the wide range of frequencies to generate a digital signal, and to digitally process said digital signal to output a data signal at baseband associated with said selected frequency band, wherein the signal processing device includes (1) a digital down-sampler and a complex channel selection filter, or (2) a polyphase filter; and
   a frequency band selector connected at least to (1) the digital down-sampler and complex channel selection filter, or (2) the polyphase filter, and configured to provide operating parameters related to the selected frequency band among the range of frequencies to (1) the digital down-sampler and complex channel selection filter, or (2) the polyphase filter.

2. The radio communication apparatus of claim 1, wherein the apparatus comprises the digital down-sampler and the complex channel selection filter and further comprises:
   an analog to digital converter configured to sample the received analog signal at said predetermined sample rate, and to output said digital signal;
   a quadrature demodulator configured to perform quadrature demodulation of the digital signal, and to output a complex signal including a complex data signal and an image of the complex data signal;
   wherein the complex channel selection filter is configured to receive the complex data signal, and to output a filtered complex signal including only one of the complex data signal or the image of the complex data signal;

wherein the digital down-sampler is configured to receive the filtered complex signal and to generate a down-sampled complex signal that includes one sample out of each group of N sequential samples in the filtered complex signal, where N is an integer number larger than or equal to two and depends on the selected frequency band; and a baseband tuner configured to receive the down-sampled complex signal, and to output a complex baseband data signal.

3. The radio communication apparatus of claim 2, wherein the complex channel selection filter is configured to filter out components of the received complex data signal having frequencies in a range depending on the selected frequency band.

4. The radio communication apparatus of claim 2, wherein the digital down-sampler is configured to select a number N depending on the selected frequency band.

5. The radio communication apparatus of claim 2, wherein the digital down sampler is configured to operate for the number N having values which are powers of 2.

6. The radio communication apparatus of claim 1, wherein the predetermined sample rate is larger than 1 GSps.

7. The radio communication apparatus of claim 2, further comprising:

a rate change filter connected to the baseband tuner, and configured to convert a digital signal input to the rate change filter and having the predetermined sample rate in a digital signal sampled at a fraction of the predetermined sample rate.

8. The radio communication apparatus of claim 2, further comprising:

an analog filter configured to receive the analog signal and to output a filtered analog signal including components having frequencies in a predetermined frequency range.

9. A method of processing a modulated analog signal, comprising:

selecting a targeted frequency band among a plurality of predetermined frequency bands;

converting an analog signal into a digital signal at a sample rate independent of the targeted frequency band;

quadrature demodulating the digital signal to output a complex signal; and filtering the complex signal to include a single image of the targeted one of the predetermined frequency bands, and down-sampling the filtered complex signal to output one sample out of each group of N sequential samples in an input digital signal, where N is an integer number larger than or equal to two and depends on the targeted frequency band, the filtering and down-sampling being performed using a polyphase filter.

10. A method of manufacturing a radio communication system operable over a wide frequency range including a plurality of frequency bands, comprising:

mounting a quadrature demodulator, a complex channel filter and a down-sampler between an analog to digital converter and a baseband tuner on a substrate; and mounting a frequency band selector configured to provide operating parameters related to a targeted band among the plurality of frequency bands, to the down-sampler and to the complex channel filter.

11. A method of manufacturing a radio communication system operable over a wide frequency range including a plurality of frequency bands, comprising:

mounting a quadrature demodulator and a polyphase filter between an analog to digital converter and a baseband tuner, on a substrate; and mounting a frequency band selector configured to provide operating parameters related to a targeted frequency band among the plurality of frequency bands, to the polyphase filter.

12. The method of claim 1, wherein the complex channel selection filter filters out a part of a signal input to the complex channel selection filter having frequencies around $2F_s-F_a-F_s/4$ and outputs a remaining signal having frequencies around $F_a-F_s/4$, wherein $F_s$ is a sampling frequency and $F_a$ is a frequency of the analog signal.

13. The method of claim 12, wherein the digital down-sampler outputs a signal having a lower frequency than a signal input to the digital down-sampler, wherein the output of the digital down-sampler has frequencies around mod $(F_a-F_s/4, F_s/N)$, wherein N is an integer number larger than or equal to two and depends on the selected frequency band.

14. The method of claim 1, wherein the complex channel selection filter is a digital filter running at a sample rate of $F_s$ and selects frequencies between $0 \le F_a \le F_s$, wherein $F_a$ is a frequency of the analog signal.

15. The method of claim 9, wherein the polyphase filter filters out a part of a signal input to the polyphase filter having frequencies around $2F_s-F_a-F_s/4$ to produce a remaining signal having frequencies around $F_a-F_s/4$, wherein $F_s$ is a sampling frequency and $F_a$ is a frequency of the analog signal.

16. The method of claim 15, wherein the polyphase filter outputs a signal having a lower frequency than a signal input to the polyphase filter, wherein the output of the polyphase has frequencies around mod$(F_a-F_s/4, F_s/N)$, wherein N is an integer number larger than or equal to two and depends on the selected frequency band.

17. The method of claim 9, wherein the polyphase runs at a sample rate of $F_s$ and selects frequencies between $0 \le F_a \le F_s$, wherein $F_a$ is a frequency of the analog signal.

* * * * *

UNITED STATES PATENT AND TRADEMARK OFFICE
CERTIFICATE OF CORRECTION

Page 1 of 1

PATENT NO. : 10,122,551 B2
APPLICATION NO. : 15/156770
DATED : November 6, 2018
INVENTOR(S) : Morris et al.

It is certified that error appears in the above-identified patent and that said Letters Patent is hereby corrected as shown below:

In the Specification

In Column 1, Line 9, delete "2015," and insert -- 2015, now Pat. No. 9,385,890, --, therefor.

In Column 1, Line 16, delete "here" and insert -- herein --, therefor.

In Column 3, Line 43, delete "is flow" and insert -- is a flow --, therefor.

In Column 5, Line 41, delete "coverts" and insert -- converts --, therefor.

In Column 6, Line 7, delete "selection filter 110" and insert -- selection filter 140 --, therefor.

In Column 6, Lines 40-41, delete "baseband complex tuner 260" and insert -- complex baseband tuner 260 --, therefor.

In Column 6, Lines 42-43, delete "baseband complex tuner 160." and insert -- complex baseband tuner 160. --, therefor.

In Column 7, Line 29, delete "covert" and insert -- convert --, therefor.

In the Claims

In Column 10, Line 22, in Claim 12, delete "The method of claim" and insert -- The radio communication apparatus of claim --, therefor.

In Column 10, Line 34, in Claim 14, delete "The method of claim" and insert -- The radio communication apparatus of claim --, therefor.

Signed and Sealed this
Thirtieth Day of July, 2019

Andrei Iancu
*Director of the United States Patent and Trademark Office*